United States Patent [19]
Hafner et al.
[11] Patent Number: 4,527,744
[45] Date of Patent: Jul. 9, 1985

[54] ELECTROMAGNETICALLY ACTUATABLE VALVE

[75] Inventors: Udo Hafner, Lorch; Rudolf Krauss, Stuttgart; Werner Langer, Litzendorf, all of Fed. Rep. of Germany

[73] Assignee: Robert Bosch GmbH, Stuttgart, Fed. Rep. of Germany

[21] Appl. No.: 518,268

[22] Filed: Jul. 28, 1983

[30] Foreign Application Priority Data

Aug. 19, 1982 [DE] Fed. Rep. of Germany ....... 3230844

[51] Int. Cl.³ ....................... F16K 31/06; F02M 51/00
[52] U.S. Cl. ................................... 239/585; 239/591; 239/DIG. 19; 251/139; 251/141
[58] Field of Search .............. 239/585, 591, DIG. 19; 251/129–141; 335/257, 277

[56] References Cited

U.S. PATENT DOCUMENTS 3,454,226 7/1969 Nielsen .............................. 239/591
4,231,525 11/1980 Palma .................................. 239/585
4,274,598 6/1981 Wilfert et al. ....................... 239/585
4,313,571 2/1982 Bellicardi et al. ................. 239/585

*Primary Examiner*—Andres Kashnikow
*Attorney, Agent, or Firm*—Edwin E. Greigg

[57] ABSTRACT

An electromagnetically actuatable valve which serves to control a flow of fluid. The valve includes a valve housing and a core of ferromagnetic material, as well as an armature which actuates a valve element cooperating with a fixed valve seat. When the magnetic coil is excited, the armature is attracted toward a stop face on the valve housing and is in contact there with an effective zone on the armature. The armature and the valve housing are formed of low-carbon steel, and both the stop face and at least the outer effective zone of the armature are provided with wear-resistant surfaces. The wear-resistant surfaces may be attained by nickel plating or by nitration.

8 Claims, 1 Drawing Figure

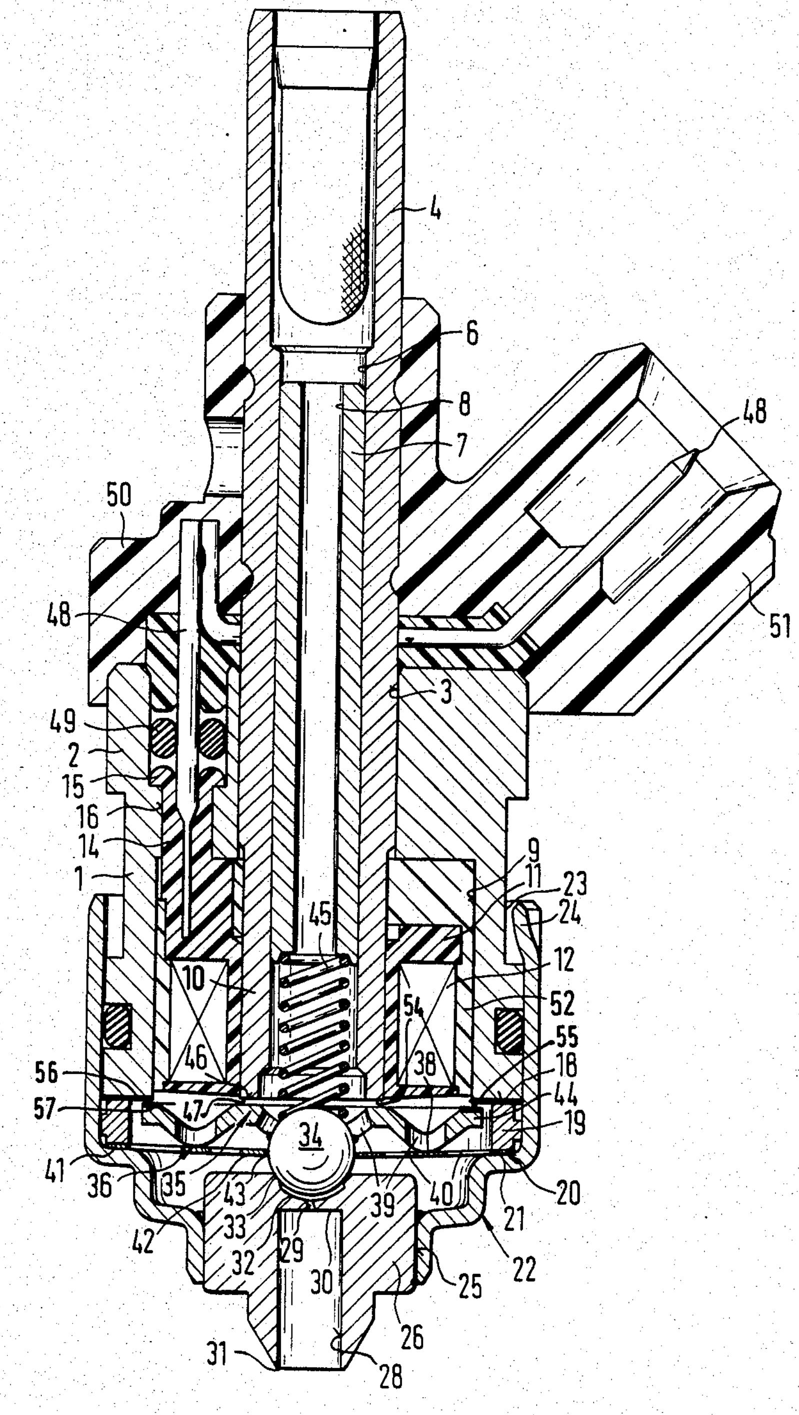
4
6
8
7
48
50
51
48
3
49
2
15
16
14
1
9
11
23
24
45
12
10
54
52
55
56
46
38
18
57
47
44
34
19
41
36
35
43
39
40
20
33
21
42
32
29
30
25
22
26
31
28

ELECTROMAGNETICALLY ACTUATABLE VALVE

BACKGROUND OF THE INVENTION

The invention is based on an electromagnetically actuatable valve as generally defined herein. An electromagnetically actuatable valve is already known in which the armature and the parts of the valve serving as a stop face are manufactured of high-grade material in order to assure the least possible wear. Such high-grade, wear-resistant materials are not only expensive, however, but are difficult to machine as well.

OBJECT AND SUMMARY OF THE INVENTION

The valve according to the invention and having the characteristics of the main claim has the advantage over the prior art that the armature and the parts forming the stop face can be manufactured of inexpensive and easily machined materials.

By means of the advantages set forth herein further embodiments of and improvements in the valve disclosed can be attained. It is particularly advantageous if the stop face and the valve are nickel-plated.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an embodiment of the invention in simplified form.

DESCRIPTION OF THE PREFERRED EMBODIMENT

The fuel injection valve for a fuel injection system which is shown in the drawing as an example of a valve serves by way of example to inject fuel into the intake tube of mixture-compressing internal combustion engines with externally-supplied ignition. A valve housing 1 is shown, which is manufactured by a chip-free shaping process such as deep drawing, rolling or the like and has a cup-shaped form with a base 2. A fuel fitting 4 embodied as a connection fitting is inserted in a sealing manner into a holder bore 3 of the base 2; the fuel inlet fitting 4 is made of ferromagnetic material and simultaneously acts as the inner core of an electromagnetically actuatable valve. The fuel inlet fitting 4 extends concentrically with respect to the valve axis and has an inner bore 6, into which an adjusting sleeve 7 having an axially extending through bore 8 is pressed. The end of the inlet fuel fitting 4 protruding out of the valve housing 1 communicates with a fuel source, for instance a fuel distributor line. The other end 10 of the inlet fuel fitting 4, which serves as the inner core of the electromagnetic device, protrudes into an internal chamber 9 of the valve housing 1 and carries an insulating carrier body 11, which at least partially surrounds a magnetic coil 12. The carrier body 11 and the magnetic coil 12 are axially fixed in a fastening bore 16 of the base 2 via at least one guide tang 14 by means of riveting or a snap-in element 15. A spacer ring 19 rests on the end face 18 of the valve housing 1 remote from the base 2, and a valve guide diaphragm 20 adjoins the spacer ring 19. The other side of the guide diaphragm 20 is engaged by a collar 21 of a nozzle carrier 22, which partially surrounds the valve housing 1 and is crimped with its end 24 into a holder groove 23 of the valve housing 1, resulting in the exertion of an axial tensioning force for the positional fixation of the spacer ring 19 and the guide diaphragm 20. Remote from the valve housing 1, the nozzle carrier 22 has a coaxial reception bore 25, in which a nozzle body 26 is inserted and is secured by welding or soldering, for instance. The nozzle body 26 has a preparation bore 28 in the form of a blind bore, at the bore bottom 30 of which at least one fuel guide bore 29 serves the purpose of metering fuel discharges. The fuel guide bore 29 preferably discharges at the bore bottom 30 of the preparation bore 28 in such a manner that a tangentially directed flow into the preparation bore 28 will not occur, but instead the fuel stream will first exit from the fuel guide bores 29 without touching the wall and then will collide with the wall of the preparation bore 28 so as to be distributed in a film over the wall of the bore 28 and to flow approximately in the form of a parabola toward the open end 31 and break off there. The fuel guide bores 29 extend at an inclination with respect to the valve axis, and they begin in a spherical chamber 32 embodied in the nozzle body 26, downstream of chamber 32 a curved valve seat 33 is embodied in the nozzle body 26. A spherically embodied valve element 34 cooperates with the curved valve seat 33. In order to attain the smallest possible clearance volume, the volume of the spherical chamber 32 should be as small as possible when the valve element 34 is resting on the valve seat 33.

Remote from the valve seat 33, the valve element 34 is connected to a linear armature 35, such as by being welded or soldered. The armature 35 may be embodied as a stamped or molded element and may be provided with an annular guide ring 36, which rests on an annular guide zone 38 of the guide diaphragm 20 on the side of the guide diaphragm 20 remote from the valve seat 33. Flowthrough openings 39 in the armature 35 and flow recesses 40 in the guide diaphragm 20 permit an unhindered flow of fuel around the armature 35 and the guide diaphragm 20. The guide diaphragm 20, which is fastened firmly to the housing between the spacer ring 19 and the collar 21 at its outer circumference in a fastening zone 41 has a centering zone 42, which surrounds a centering opening 43 through which the movable valve element 34 protrudes and is centered in the radial direction. The fastening of the guide diaphragm 20 firmly to the housing between the spacer ring 19 and the collar 21 is effected in a plane which when the valve element 34 is resting on the valve seat 33 extends through the center, or as close as possible to the center, of the spherically embodied valve element.

By means of the guide zone 38 of the guide diaphragm 20 engaging the guide ring 36 of the armature 35, the armature 35 is guided as parallel as possible to the end face 18 of the valve housing 1, beyond which it protrudes to some extent with an outer effective zone 44. A compression spring 45 is guided in the inner bore 6 of the end of the guide inlet fitting 4 which extends almost to the armature 35 and acts as the inner core 10 of the electromagnet. The compression spring 45 engages the valve element 34 at one end of the spring and the adjusting sleeve 7 at the other end of the spring and urges the valve element 34 in the direction of the valve seat 33.

A small air gap 54 then exists between an end face 46 of the inner core 10 oriented toward the armature 35 and an inner effective zone 47 of the armature 35 whenever the armature 35 is excited by the magnetic coil 12 in the excited state. The armature 35 comes to rest with its outer effective zone 44 on the end face 18 of the valve housing 1 which serves as a stop face; on the other hand, if the magnetic coil 12 is in the non-excited state, the armature 35 assumes a position in which an air gap 55 is likewise formed between the stop face 18 and the effective zone 44. As a result, the armature 35 is prevented from sticking to the inner core 10. The inlet fuel fitting 4 is advantageously welded or soldered to the housing base 2. The magnetic circuit passes externally via the valve housing 1 and internally via the inlet fuel fitting 4 and closes via the flat armature 35 which is attracted thereby.

The supply of current to the magnetic coil 12 is effected via contact lugs 48, which are injected partway into the plastic carrier body 11 and on the other end protrude from the housing 1 via the fastening bores 16 in the base 2. The contact lugs 48 may, as shown, take a course that is bent at an angle to the valve axis. The contact lugs 48 which are partially surrounded by the guide tangs 14 of the carrier body 11 are surrounded by sealing rings 49 in order to effect sealing in the fastening bore 16 and are then sprayed to form a plastic jacket 50 which likewise at least partially surrounds the inlet fuel fitting 4 and the base 2. In the vicinity of the ends of the contact lugs 48, the plastic jacket 50 is molded into a plug connection 51.

When the magnetic coil 12 has current running through it and the armature 35 is thus attracted, the fuel flowing in via the fuel fitting 4 can be partially metered at the fuel guide bores 29 and can be ejected via the preparation bore 28.

The inner core 10, the carrier body 11 and the magnetic coil 12 do not completely fill the internal chamber 9 of the valve housing 1. It may therefore be efficacious to spray a plastic jacket 52 around the carrier body 11 and the magnetic coil 12 prior to their assembly inside the internal chamber 9; in the assembled state, this jacket 52 then fills up the space remaining between the inner core 10, the carrier body 11, the magnetic coil 12 and the inside diameter of the internal chamber 9 of the valve housing 1. The result is the prevention of a clearance volume in which liquid becomes stagnant and causes corrosion.

In known valves of this type, high-grade, wear-resistant materials are used for the valve housing 1 and the armature 35, in order to prevent wear at the points of contact on the end face 18 and the outer effective zone 44 of the flat armature 35, because such wear causes undesirable changes in the valve characteristic. Such high-grade materials are not only expensive but are also substantially more difficult to machine.

In accordance with the invention, it is set forth that the valve housing 1 and the armature 35 be manufactured of low-carbon steel (carbon content lower than 0.3%) and that the armature 35 and the stop face 18 of the valve housing 1 be provided with an adjacent wear-resistant surface. As a result, not only are the costs for material for the valve housing 1 and the armature 35 substantially lower, but easier machining of the valve housing 1 and the armature 35 are also assured. Wear-resistant surfaces on the stop face 18 of the valve housing 1 and on the armature 35 can be attained by providing the stop face 18 with a nickel coating 56, by way of example, and by providing preferably only the outer effective zone 44 of the armature 35 with a nickel coating 57. The nickel coatings 56 and 57 may by way of example be applied by known chemical methods. The other areas of the armature 35 may be covered during this process in such a way that no nickel is deposited on these other areas, which also assures that the valve element 34 can be welded or soldered to the flat armature 35 without difficulty. The thickness of the nickel coating 56 or 57 may be selected such that when the magnetic coil 12 is excited, that is, when the nickel coatings 56, 57 are in contact with one another, the desired air gap 54 is effected between the end face 46 of the inner core 10 and the inner effective zone 47.

Instead of the nickel coatings 56 and 57, the stop faces 18 and the armature 35 may also be made wear-resistant by nitration. This is accomplished in that in a known manner, these elements are exposed at high temperatures to atomic nitrogen for a relatively long period, so that very hard nitrides form on the surfaces. The nitration process is performed either in gases or in salt baths.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An electromagnetically actuatable fuel injection valve for fuel injection systems of internal combustion engines comprising a valve housing formed of low carbon steel and a core of ferromagnetic material and an armature actuating a valve element secured to said armature and cooperating with a fixed valve seat, a stop face embodied on said valve housing, which armature is attracted toward said stop face embodied on said valve housing, when the magnetic coil is excited, characterized in that said armature and said stop face are both provided with an applied wear-resistant surface coating.

2. A valve as defined by claim 1, characterized in that said armature is nickel-coated.

3. A valve as defined by claim 1, characterized in that said armature is nickel-coated only in an effective zone cooperating with the stop face.

4. A valve as defined by claim 3, characterized in that the thickness of the nickel coating on the effective zone of said armature cooperating with said stop face and the thickness of the nickel coating on the stop face are selected such that a predetermined air gap is formed between the core and the effective zone of the armature oriented toward the core.

5. An electromagnetically actuatable fuel injection valve for fuel injection systems of internal combustion engines comprising a valve housing formed of a low carbon steel and a core of ferromagnetic material and an armature actuating a valve element secured to said armature and cooperating with a fixed valve seat, a nickel coated stop face embodied on said valve housing, which armature is attracted toward said nickel coated stop face embodied on said valve housing when the magnetic coil is excited, characterized in that said armature is provided with an applied wear-resistant surface coating.

6. A valve as defined by claim 4, characterized in that said armature is nickel-coated.

7. A valve as defined by claim 5, characterized in that said armature is nickel-coated only in an effective zone cooperating with the stop face.

8. A valve as defined by claim 7, characterized in that the thickness of the nickel coating on the effective zone of said armature cooperating with said stop face and the thickness of the nickel coating on the stop face are selected such that a predetermined air gap is formed between the core and the effective zone of the armature oriented toward the core.

* * * * *